US009798342B2

(12) United States Patent
Gubba Ravikumar et al.

(10) Patent No.: US 9,798,342 B2
(45) Date of Patent: Oct. 24, 2017

(54) DETECTION AND CORRECTION OF FAULT INDUCED DELAYED VOLTAGE RECOVERY

(71) Applicant: Schweitzer Engineering Laboratories, Inc., Pullman, WA (US)

(72) Inventors: Krishnanjan Gubba Ravikumar, Pullman, WA (US); Scott M. Manson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 188 days.

(21) Appl. No.: 14/629,292

(22) Filed: Feb. 23, 2015

(65) Prior Publication Data

US 2016/0246666 A1 Aug. 25, 2016

(51) Int. Cl.
*G05F 1/625* (2006.01)
*H02P 8/36* (2006.01)

(52) U.S. Cl.
CPC .................................... *G05F 1/625* (2013.01)

(58) Field of Classification Search
CPC ............. G06F 11/0793; G06F 11/0709; G06F 11/079; G05F 1/625
USPC .......................................................... 700/292
See application file for complete search history.

(56) References Cited

U.S. PATENT DOCUMENTS 4,349,744 A 9/1982 Reuther
4,387,336 A 6/1983 Joy
4,829,298 A 5/1989 Fernandes
4,874,961 A 10/1989 Henderson
5,006,846 A 4/1991 Granville
5,224,011 A 6/1993 Yalla
5,341,265 A 8/1994 Westrom
5,446,682 A 8/1995 Janke
5,498,956 A 3/1996 Kinney
5,592,393 A 1/1997 Yalla
5,596,492 A 1/1997 Divan
5,693,404 A 12/1997 Shiraishi et al.
(Continued)

OTHER PUBLICATIONS

Greg Zweigle, Expand Synchrophasor Capabilities with the Substation Phasor Data Concentrator, Feb. 18, 2010.
(Continued)

*Primary Examiner* — Robert Fennema
*Assistant Examiner* — Jigneshkumar Patel
(74) *Attorney, Agent, or Firm* — Jared L. Cherry; Richard M. Edge

(57) ABSTRACT

Disclosed herein are methods for detecting and correcting a fault induced delayed voltage recovery event in an electric power transmission and distribution system. In some embodiments, a fault detection subsystem may receive an indication of a fault in the electric power transmission and distribution system. The system may also include a load analysis subsystem to analyze a plurality of loads supplied by the electric power system and to generate an estimated response of the loads. A fault analysis subsystem may analyze a plurality of factors relating to the fault and to determine a probability of the fault generating a fault induced delayed voltage recovery event. A control system may then implement a control strategy within a control window following the fault based on the probability of the fault generating a fault induced delayed voltage recovery event and the estimated response of the at least one load.

23 Claims, 6 Drawing Sheets

(56) References Cited

U.S. PATENT DOCUMENTS

| | | | | |
|---|---|---|---|---|
| 5,694,281 | A | 12/1997 | Roberts | |
| 5,703,745 | A | 12/1997 | Roberts | |
| 5,731,943 | A | 3/1998 | Roberts | |
| 6,028,754 | A | 2/2000 | Guzman | |
| 6,236,949 | B1 | 5/2001 | Hart | |
| 6,265,881 | B1 | 7/2001 | Meliopoulos | |
| 6,285,917 | B1 | 9/2001 | Sekiguchi | |
| 6,341,055 | B1 | 1/2002 | Guzman | |
| 6,356,421 | B1 | 3/2002 | Guzman | |
| 6,356,471 | B1 | 3/2002 | Fang | |
| 6,411,865 | B1 | 6/2002 | Qin | |
| 6,442,010 | B1 | 8/2002 | Kasztenny | |
| 6,446,682 | B1 | 9/2002 | Viken | |
| 6,603,298 | B2 | 8/2003 | Guzman | |
| 6,608,742 | B2 | 8/2003 | Schweitzer | |
| 6,662,124 | B2 | 12/2003 | Schweitzer | |
| 6,694,270 | B2 | 2/2004 | Hart | |
| 6,757,146 | B2 | 6/2004 | Benmouyal | |
| 6,839,210 | B2 | 1/2005 | Roberts | |
| 6,845,333 | B2 | 1/2005 | Anderson | |
| 6,915,186 | B2 | 7/2005 | Patterson, Jr. | |
| 6,946,753 | B2 | 9/2005 | Kernahan | |
| 7,072,744 | B2 | 7/2006 | Kuwabara | |
| 7,116,010 | B2 | 10/2006 | Lasseter | |
| 7,196,884 | B2 | 3/2007 | Guzman | |
| 7,319,576 | B2 | 1/2008 | Thompson | |
| 7,356,422 | B2 | 4/2008 | Schweitzer | |
| 7,457,688 | B2 | 11/2008 | Szepek | |
| 7,480,580 | B2 | 1/2009 | Zweigle | |
| 7,570,469 | B2 | 8/2009 | Guzman | |
| 7,582,986 | B2 | 9/2009 | Folkers | |
| 7,630,863 | B2 | 12/2009 | Zweigle | |
| 7,635,967 | B2 | 12/2009 | Loucks | |
| 7,660,088 | B2 | 2/2010 | Benmouyal | |
| 7,710,693 | B2 | 5/2010 | Guzman | |
| 7,761,910 | B2 | 7/2010 | Ransom | |
| 7,856,327 | B2 | 12/2010 | Schweitzer | |
| 7,903,381 | B2 | 3/2011 | Fischer | |
| 7,930,117 | B2 | 4/2011 | Guzman-Casillas | |
| 8,082,367 | B2 | 12/2011 | Etheridge | |
| 8,405,247 | B2 | 3/2013 | Miller | |
| 8,410,633 | B2 | 4/2013 | Batzler | |
| 8,560,255 | B2 | 10/2013 | Elwarry | |
| 8,766,479 | B2 | 7/2014 | Dorn | |
| 2002/0105231 | A1* | 8/2002 | Koeppe | H02J 3/185 307/64 |
| 2004/0021470 | A1 | 2/2004 | Adams | |
| 2004/0027748 | A1 | 2/2004 | Kojovic | |
| 2004/0059469 | A1 | 3/2004 | Hart | |
| 2004/0138834 | A1 | 7/2004 | Blackett | |
| 2004/0252525 | A1 | 12/2004 | Aldridge | |
| 2005/0144437 | A1 | 6/2005 | Ransom | |
| 2006/0077605 | A1* | 4/2006 | Folkers | H02J 3/14 361/92 |
| 2006/0224336 | A1 | 10/2006 | Petras | |
| 2006/0259255 | A1 | 11/2006 | Anderson | |
| 2007/0086134 | A1 | 4/2007 | Zweigle | |
| 2007/0100504 | A1 | 5/2007 | Moxley | |
| 2007/0103004 | A1 | 5/2007 | Chou | |
| 2007/0198985 | A1* | 8/2007 | Yanagihashi | H02J 3/18 718/105 |
| 2007/0219755 | A1 | 9/2007 | Williams | |
| 2007/0222294 | A1 | 9/2007 | Tsukida | |
| 2007/0239372 | A1 | 10/2007 | Schweitzer | |
| 2008/0040296 | A1 | 2/2008 | Bridges | |
| 2008/0204044 | A1 | 8/2008 | Ponnaluri | |
| 2008/0225452 | A1 | 9/2008 | Stoupis | |
| 2008/0232005 | A1 | 9/2008 | Kuehnle | |
| 2008/0281540 | A1 | 11/2008 | Zweigle | |
| 2009/0021082 | A1 | 1/2009 | Loucks | |
| 2009/0079266 | A1 | 3/2009 | McNamara | |
| 2009/0085407 | A1 | 4/2009 | Venkatasubramanian | |
| 2009/0088989 | A1 | 4/2009 | Guzman | |
| 2009/0088990 | A1 | 4/2009 | Schweitzer | |
| 2009/0089608 | A1 | 4/2009 | Guzman | |
| 2009/0091867 | A1 | 4/2009 | Guzman | |
| 2009/0099798 | A1 | 4/2009 | Gong | |
| 2009/0125158 | A1 | 5/2009 | Schweitzer | |
| 2009/0198383 | A1 | 8/2009 | Gardner | |
| 2009/0254655 | A1 | 10/2009 | Kidwell | |
| 2009/0276173 | A1 | 11/2009 | Wang | |
| 2010/0002348 | A1 | 1/2010 | Donolo | |
| 2010/0104847 | A1 | 4/2010 | Ciavatta | |
| 2010/0114390 | A1 | 5/2010 | Stevenson | |
| 2010/0145536 | A1 | 6/2010 | Masters | |
| 2010/0152910 | A1 | 6/2010 | Taft | |
| 2010/0198423 | A1 | 8/2010 | Hirst | |
| 2011/0004324 | A1 | 1/2011 | Bickel | |
| 2011/0022734 | A1 | 1/2011 | Etheridge | |
| 2011/0062708 | A1 | 3/2011 | Prochaska | |
| 2011/0068576 | A1 | 3/2011 | Meier | |
| 2011/0074215 | A1* | 3/2011 | Vartanian | H02J 3/12 307/46 |
| 2011/0077885 | A1 | 3/2011 | Zweigle | |
| 2011/0190958 | A1 | 8/2011 | Hirst | |
| 2011/0213606 | A1 | 9/2011 | Seaman | |
| 2011/0251732 | A1 | 10/2011 | Schweitzer | |
| 2011/0298286 | A1 | 12/2011 | Batzler | |
| 2012/0226386 | A1 | 9/2012 | Kulathu | |
| 2013/0096724 | A1 | 4/2013 | Divan | |
| 2013/0138260 | A1 | 5/2013 | Divan | |
| 2013/0173078 | A1 | 7/2013 | Divan | |
| 2014/0103888 | A1 | 4/2014 | Divan | |
| 2014/0250972 | A1* | 9/2014 | Achanta | G01S 19/13 73/1.43 |
| 2014/0301120 | A1* | 10/2014 | Zhu | H02H 7/06 363/49 |
| 2014/0319932 | A1* | 10/2014 | Russell | H02J 3/01 307/125 |

OTHER PUBLICATIONS

Andrew Swinghamer, Create a Synchrophasor Network with the SEL-3378 Synchrophasor Vector Processor, Aug. 6, 2009.

Yanfeng Gong, Using Synchrophasor-Based Modal Analysis to Detect Unstable Power System Oscillations, Jun. 24, 2009.

Schweitzer Engineering Laboratories, Inc., Case Study, Powergrid Corporation—India, Using Wide-Area Synchrophasor Measurements to Improve System Reliability, Sep. 10, 2010.

Schweitzer Engineering Laboratories, Inc., SEL-3378 Instruction Manual, Apr. 4, 2008.

Schweitzer Engineering Laboratories, Inc., SEL-3530 Real-Time Automation Controller RTAC Instruction Manual, Sep. 15, 2009.

Terry L. Conrad, Distributed State Estimator at U.S. Virgin Islands Water and Power Authority St. Thomas and St. John, NASPI Working Group Meeting, Mar. 7, 2008.

A.P. Sakis Meliopoulos, George J. Cokkinides, Floyd Galvan, Bruce Fardanesh, Distributed State Estimator-Advances and Demonstration, 41st Annual Hawaii International Conference on System Sciences, Jan. 2008.

Pserc- Ali Abur andMLADEN Kezunovic, Sakis Meliopoulos, Enhanced State Estimation by Advanced Substation Monitoring, Power Systems Engineering Research Center, Nov. 2002.

Saman A. Zonouz and William H. Sanders, A Kalman-based Coordination for Hierarchical State Estimation: Algorithm and Analysis, 41st Annual Hawaii International Conference on System Sciences, Jan. 2008.

ABB: Improved Power System Performance through Wide Area Monitoring, Protection, and Control, Jan. 2004.

ABB, Wide Area Measurement, Monitoring, Protection and Control Industrial It for Energy System Operation—Jan. 2003.

Sasa Jakovljevic, Mladen Kezunovic, Software for Enhanced Monitoring in Integrated Substations, 2003 IEEE Bologna Power Tech Conference, Jun. 23-26, 2003.

Y. Wu, M. Kezunovic, Automatic Simulation of IED Measurements for Substation Data Integration Studies, Power Engineering Society General Meeting, Jun. 12-16, 2005.

Sasa Jakovljevic, Data Collecting and Processing for Substation Integration Enhancement, May 2003.

(56) References Cited

OTHER PUBLICATIONS

M. Kezunovic, G. Latisko, Automated Monitoring Functions for Improved Power System Operation and Control, Power Engineering Society General Meeting, Jun. 12-16, 2005.

PCT/US2011/046437 International Search Report and Written Opinion of the International Searching Authority, Patent Cooperation Treaty, Dec. 16, 2011.

Arshad Saleem, Agent Services for Situation Aware Control of Power Systems with Distributed Generation, 2009 IEEE [retrieved on Jan. 28, 2013 from the internet <url:http://orbi.dtu.dk/fedora/objects/orbit:55496/datastreams/file_3761170/content> ].

Chanin Choniratisai, HVDC Stability Functions and Implementation in Thailand, CEPSI 2004. [retrieved on Jan. 28, 2013 from the internet <URL://http://www.researchgate.net/CEPSI2004> ].

PCT/US2012/0068962 International Search Report and Written Opinion of the International Searching Authority, Patent Cooperation Treaty, Feb. 25, 2013.

G.T. Heydt, C.C. Liu, A.G. Phadke, V. Vittal, Solutions for the Crisis in Electric Power Supply, IEEE Computer Applications in Power, Jul. 2001.

Luc Meysenc, M. Jylhakallio, Peter Barbosa, Power Electronics Cooling Effectiveness Versus Thermal Inertia, IEEE Transactions on Power Electronics, vol. 20, No. 3, May 2005.

R.A. Walling, N.W. Miller, Distributed Generation Islanding-Implications on Power System Dynamic Performance, IEEE Power Enginnering Society Summer Meeting vol. 1, Jul. 25, 2002.

M. Ezzt, M.I. Marei, M. Abdel-Rahman, M.M. Mansour, A Hybrid Strategy for Distributed Generators Islanding Detection, IEEE PES Power Africa 2007 Conference and Exposition Johannesburg, South Africa, May 16-20, 2007.

Mats Larsson, Christian Rehtanz, Predictive Frequency Stability Control Based on Wide-Area Phasor Measurements, IEEE Power Engineering Society Summer Meeting vol. 1, Jul. 2002.

Jun Yin, Liuchen Chang, Chris Diduch, Recent Developments in Islanding Detection for Distributed Power Generation, IEEE Power Engineering, Jul. 2004.

Xiaoming Wang, Vijay Vittal, System Islanding Using Minimal Cutsets with Minimum Net Flow, IEEE Power Systems Conference and Exposition, Oct. 2004.

Dongchen Hu, Vaithianathan Venkatasubramanian, New Wide Area Algorithms for Detection and Mitigation of Angle Instability Using Synchrophasors, IEEE Power Engineering Society General Meeting, Jun. 2007.

Robert J. Best, D. John Morrow, David J. McGowan, Peter A. Crossley, Synchronous Islanded Operation of a Diesel Generator, IEEE Transactions on Power Systems, vol. 22, No. 4, Nov. 2007.

Olof Samuelsson, Helga Johannsdottir, Nils Gustavsson, Thorhallur Hrafnsson, Daniel Karlsson, Mike Kockott, Johan Salj, Arve Sollie, Power System Damping in Iceland Based on Phasor Measurements, Jul. 2, 2006.

Gabriel Benmouyal, E. O. Schweitzer, A. Guzman, Synchronized Phasor Measurement in Protective Relays for Protection, Control, and Analysis of Electric Power Systems, 29th Annual Western Protective Relay Conference, Oct. 22-24, 2002.

A.G. Phadke, Synchronized Phasor Measurement in Power Systems, IEEE Comput. Appl., vol. 6, No. 2, pp. 10-15, Apr. 1993.

Edmund O. Schweitzer, III, David Whitehead, Armando Guzman, Yanfeng Gong, Marcos Donolo, Advanced Real-Time Synchrophasor Applications, Western Protective Relay Conference, Oct. 2008.

Dale Williston, Dale Finney, Consequences of Out-of-Phase Reclosing on Feeders with Distributed Generators, Dec. 3, 2010.

Michael J. Thompson, Fundamentals and Advancements in Generator Synchronizing Systems, Dec. 9, 2010.

Michael J. Thompson, New Developments in Generator Synchronizing Systems, Feb. 10, 2011.

PCT/US2012/055107 Patent Cooperation Treaty, International Search Report and Written Opinion of the International Searching Authority, Nov. 23, 2012.

* cited by examiner

600
Monitored Equipment Interface
608
Communications Interface
616
Remote Fault Detection Subsystem
634
Load Analysis Subsystem
650
Load Priority Subsystem
652
642
Time Input
612
Processor
624
Remote Fault Analysis Subsystem
632
Temperature Analysis Subsystem
644
Control Subsystem
648
610
A/D Converters
618
602
614
I
V

DETECTION AND CORRECTION OF FAULT INDUCED DELAYED VOLTAGE RECOVERY

TECHNICAL FIELD

The present disclosure pertains to systems and methods for detecting the occurrence of a fault that is likely to result in a fault induced delayed voltage recovery (FIDVR) event and to implementing control strategies to avoid or reduce the severity of the FIDVR event.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
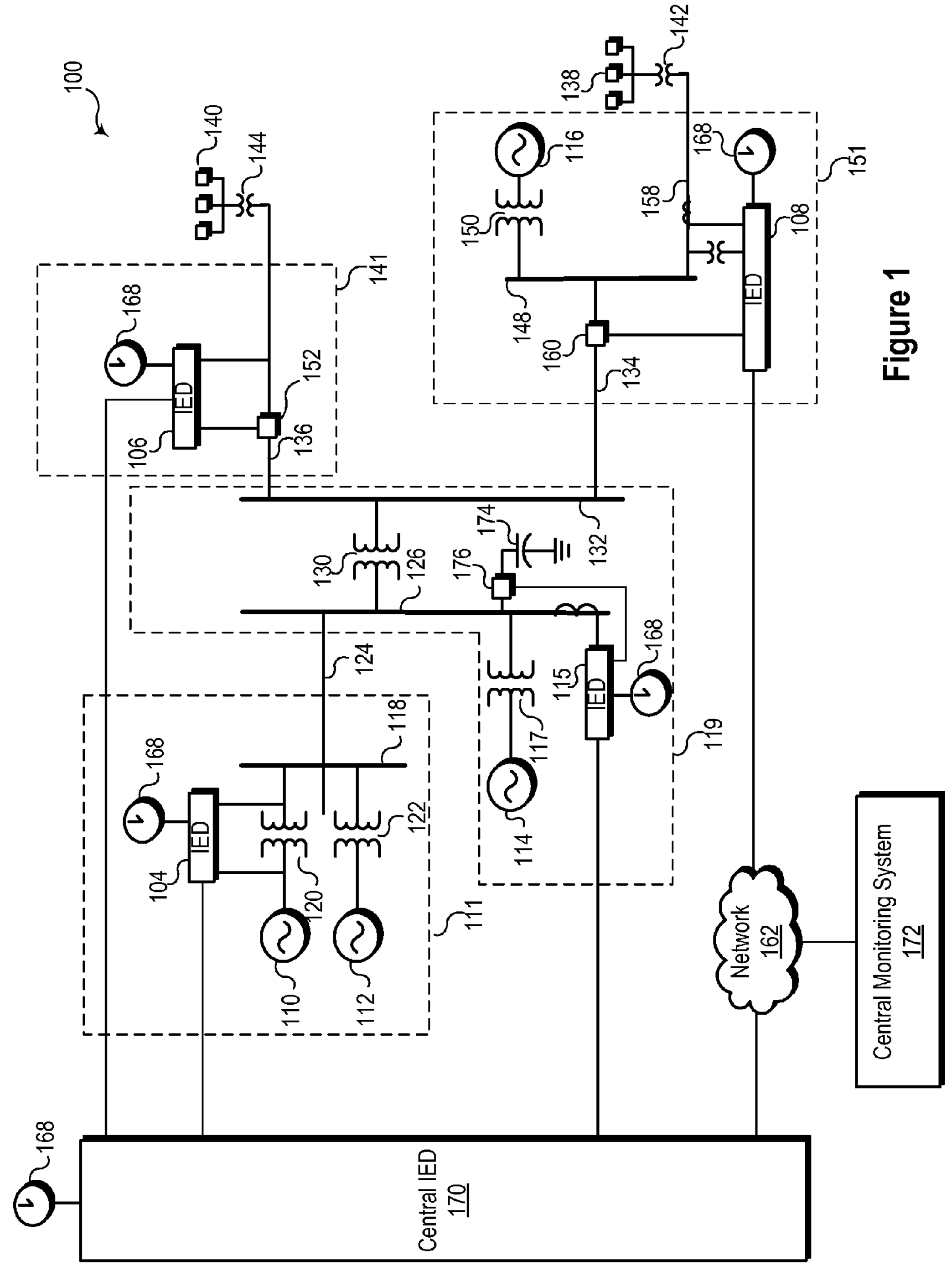
FIG. 1 illustrates an example of an embodiment of a simplified one-line diagram of an electric power transmission and distribution system in which an FIDVR event may occur consistent with embodiments of the present disclosure.

When a fault occurs in an electric power transmission and distribution system, the fault may depress voltages throughout the load area “downstream” of the fault location. Modern electric power transmission and distribution systems employ a variety of types of equipment and techniques to identify faults and to de-energize affected areas of the system to clear the fault. Under normal conditions, once the fault is cleared load voltages return to normal values. Under certain conditions, however, the voltage in the load area may not recover promptly when the fault is cleared. Rather, the immediate increase in voltage when the fault is cleared may be smaller than expected and full recovery to normal voltage has been observed to take many seconds or even a few minutes. The occurrence of such events have been observed and documented by operators of electric power transmission and distribution systems. The present disclosure is addressed to systems and methods for identifying the occurrence of FIDVR events and to implementing control strategies to avoid or reduce the severity of the FIDVR event.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates an example of an embodiment of a simplified one-line diagram of an electric power transmission and distribution system 100 in which an FIDVR event may occur consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multifunction hardware (e.g., processors, computer-readable storage media, communications interfaces, etc.) that can be utilized in order to perform a variety of tasks that pertain to network communications and/or to operation of equipment within system 100.

A fault in system 100 may result in an FIDVR event in certain conditions. For example, such conditions may include power factors reflecting a high ratio of inductive loads to resistive loads. Such a load profile may be created, for example by a large number of motors or other types of inductive loads. Residential air conditions may present such a load profile. The inertial constants of small motors are small (typically less than 40 milliseconds, and accordingly, may stall in response to relatively small voltage fluctuations. As such, it has been observed that faults cleared in as little as 50 milliseconds (3 cycles in a system with a nominal frequency of 60 Hz) can cause widespread stalling. Accordingly, various embodiments of the present disclosure may be configured to identify a fault that is likely to result in an FIDVR event and to implement a control strategy to avoid or reduce the severity of the FIDVR event within a control window of between 50 and 100 milliseconds after the fault and excluding a breaker operation time.

Once a motor is stalled, current flowing through the motor increases dramatically. The additional current flow may lead to a temperature increase until a thermal cutoff threshold is reached and further current flow is interrupted. After the thermal threshold is exceeded and additional current flow is cut off, the temperature of the device may begin to decrease. Once the device has cooled, the device may resume normal operation. As a result of the time needed for the individual air conditioning systems to reach the thermal threshold and to cool down after reaching the thermal threshold, the voltage of an electric distribution system may remain depressed for an extended period of time (e.g., on the order of minutes). While the voltage in the system is depressed, the system may face an increased risk of blackout.

With reference to FIG. 1, loads 138, 140 may reflect a residential community, in which the load profile becomes increasingly inductive as a result of the operation of air conditioners during times of high temperatures. In the event of a fault during such conditions, system 100 may experience depressed voltages at the terminals of air conditioner motors, and in response, the motors may stall. One of skill in the art will appreciate that other conditions may also give rise to an FIDVR event, and the present disclosure is not limited to the specific circumstances disclosed herein.

As discussed in greater detail below, systems and methods consistent with the present disclosure may be configured to identify such an event and may implement control strategies configured to avoid or minimize the severity of the FIDVR event. For example, in certain embodiments, after detecting an FIDVR event, reactive power support may be provided by selectively connecting a capacitor bank 174 to system 100 using a breaker 176. Connecting the capacitor bank 174 may provide reactive power support to avoid or mitigate the severity of an FIDVR event. Other control strategies may also be employed, such as controlling tap changes on transformers 130, 142, and 144 or selectively disconnecting loads 138 or 140 or to preserve the stability of system 100.

Figure 2:
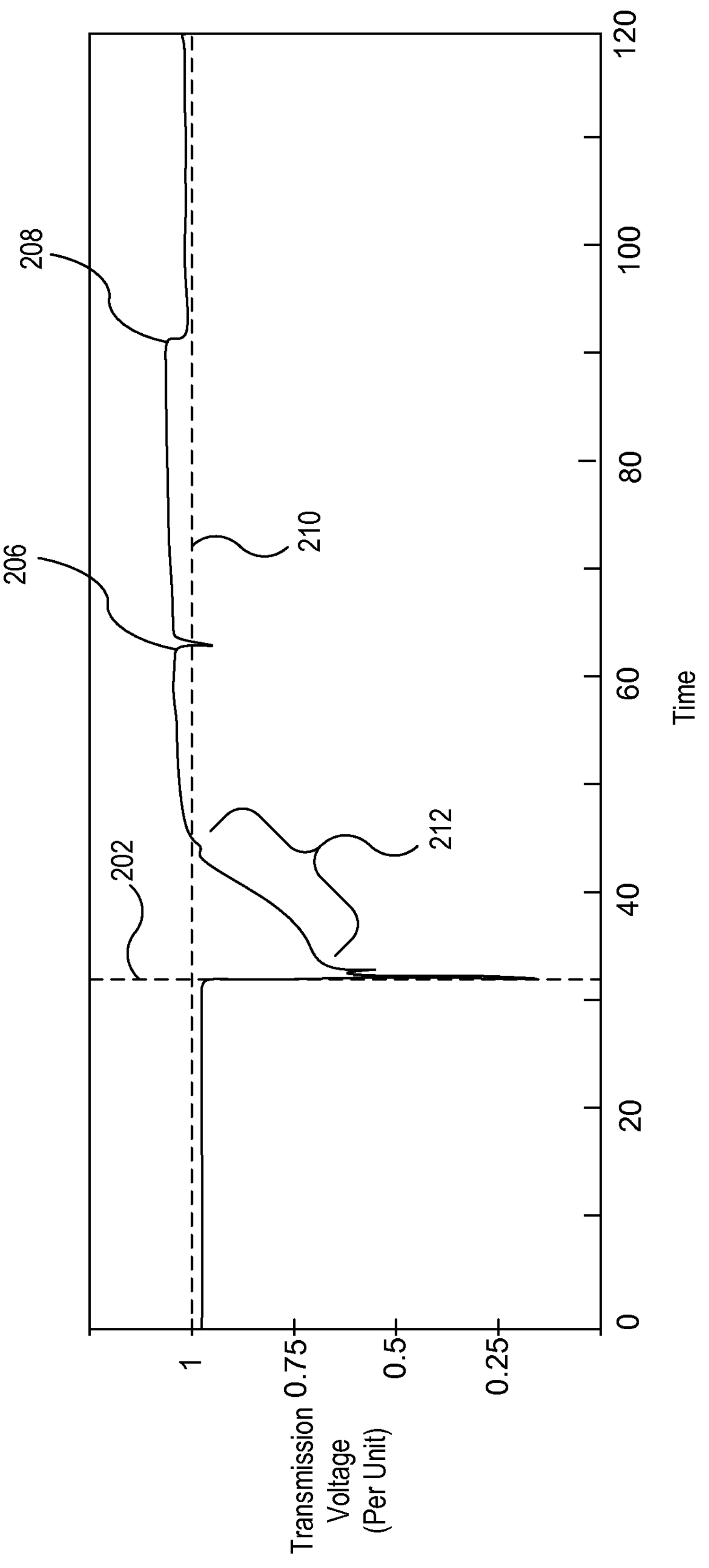
FIG. 2 illustrates a plot of a transmission voltage over a period of time including a fault and an FIDVR event consistent with embodiments of the present disclosure.

FIG. 2 illustrates a plot of a transmission voltage over a time period including a fault and an FIDVR event consistent with embodiments of the present disclosure. A fault may occur at the time indicated by dashed line 202 and may cause a brief but significant decline in voltage. In response to faults, modern electric power transmission systems typically react quickly (e.g., within a few cycles) to clear the fault. In spite of the fault being cleared quickly, certain conditions may exist that cause the effect of the fault to persist for an extended period of time.

As discussed above, an FIDVR event may result from the combined stalling effect of a large number of motors in residential air conditioning systems. When the amplitude of the voltage at the terminals of a motor is reduced suddenly (e.g., when the fault occurs at time 202) or when the voltage is ramped at a moderate rate (e.g., at time 212), the motors are at risk of stalling. One factor influencing whether a particular motor will stall is the phase of the voltage at the instant that the step is applied. The greatest likelihood of the motor stalling may be when the voltage is at 0° because this phase corresponds to 90° of flux. Accordingly, various embodiments consistent with the present disclosure may determine the voltage phase at the time of the fault and may assess whether the voltage phase is likely to contribute to the occurrence of an FIDVR event.

Motors in air conditioning units deployed in an electric power transmission and distribution system have varying physical parameters (e.g., windings of the motor may have a different number of turns, may carry different currents, etc.). As a result, the torque developed by different motors may also vary from one air conditioning unit to another and over time. The average rotor speed is slower than synchronous with respect to the power system frequency, and the instantaneous rotor speed is not constant but varies in accordance with the variation of electromagnetic and load torques. The result of the non-synchronism of the driving and resisting torques is that the variation of rotor speed is not constant even in steady supply conditions. Instead, the variations of electromagnetic torque, load torque, and rotor speed may follow a pattern determined by the difference between synchronous and rotor speeds. The internal condition of the motor at the moment of inception of a fault may be a function of the operational history of the driven load because the wave of rotor-synchronized load torque constantly slips in phase with respect to the phase of the supply voltage. In a real population of motors the relative phase of electromagnetic torque and load torque at the moment a supply disturbance (e.g., a fault) would be largely random.

After the fault is cleared other control actions may be taken to stabilize the system; however, the fault may have caused a number of motors in air conditioning units to stall. These stalled motors may result in a large current draw and a corresponding large drop in the system's voltage following the fault. The stalled motors may continue to draw an abnormally large current until reaching a thermal cutoff point. Accordingly, the distribution voltage may remain substantially below the nominal voltage 210.

In some circumstances, control actions that are implemented slowly (e.g., implemented by operator action) may contribute to variations in the distribution voltage. For example, a capacitor bank may be connected to provide reactive power support to the system. Such an action may cause a voltage to rise. As the voltage rises above the nominal voltage 210, other actions may be taken to reduce the voltage. For example, at 206, a tap change may occur in a transformer. In the illustrated example, another tap change may be required at 208 before the voltage returns to an acceptable range near the nominal voltage. In the illustrated example, the fluctuations in voltage may leave the electric power distribution system more vulnerable to blackouts. Accordingly, detecting the circumstances in which an FIDVR event is likely to occur may aid in the development and timely execution of control strategies optimized to avoid or minimize the severity the FIDVR event.

Figure 3:
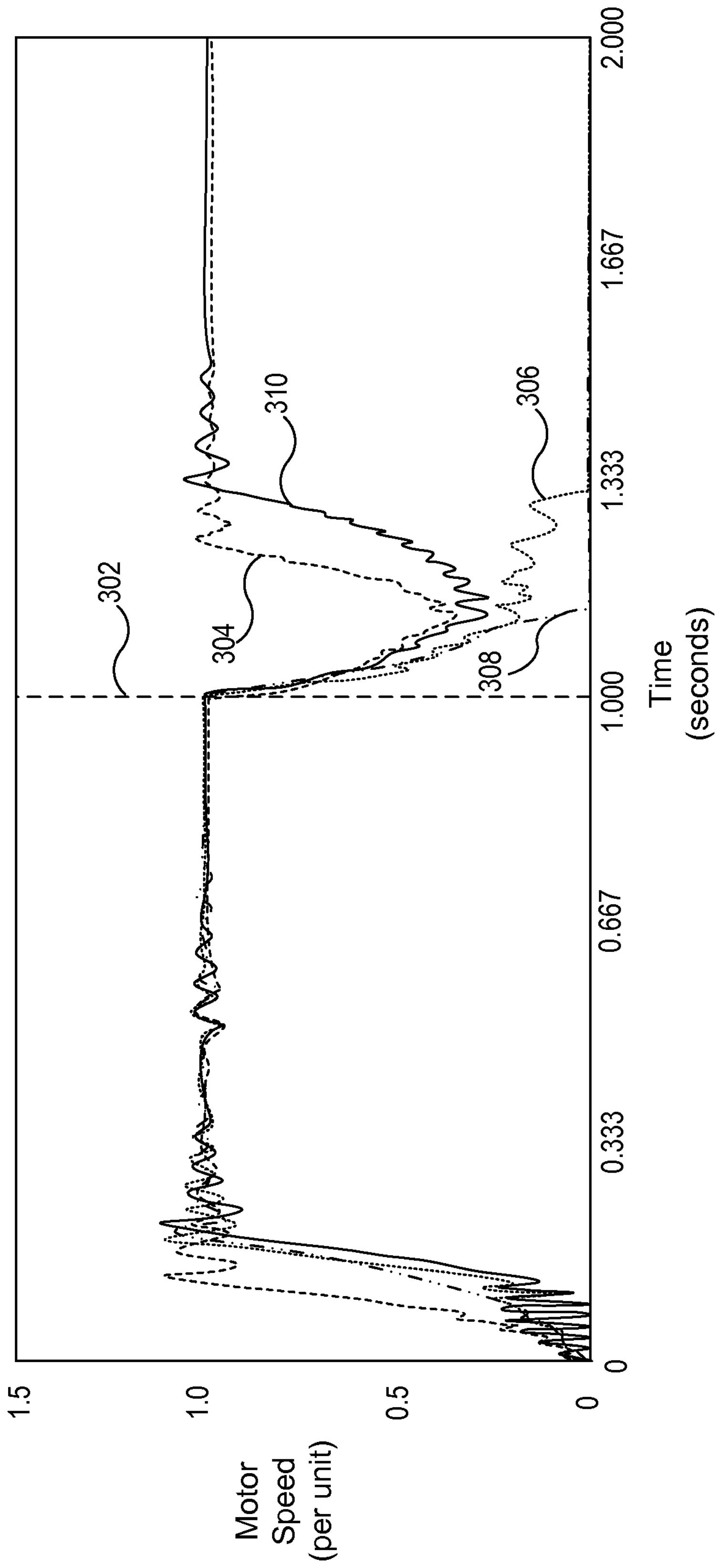
FIG. 3 illustrates a plot representing the per unit speed of a plurality of electric motors used in air conditioners over a period of time including a fault consistent with embodiments of the present disclosure.

FIG. 3 illustrates a plot representing the per unit speed of a plurality of electric motors 304, 306, 308, and 310 used in air conditioners over a period of time including a fault consistent with embodiments of the present disclosure. In the illustrated embodiment, the motors start from zero speed at time zero and increase to a steady-state per unit operating speed. The plurality of motors 304, 306, 308, and 310 are small motors with correspondingly small inertial constants, and accordingly, the motors speed up rapidly.

The fault may occur at the time indicated by dashed line 302. The speed of the motors declines rapidly following the fault at time 302 because of the small inertial constants of the plurality of motors. As illustrated, each of the plurality of motors 304, 306, 308, and 310 may respond differently to the fault. Motors 306 and 308 stall in response to the fault; however, motor 308 stalls more rapidly than motor 306. In contrast, motors 304 and 310 recover after the fault, with motor 304 recovering more quickly than motor 310. The differing responses illustrated in FIG. 3 may reflect differences in the designs of the various motors and their relative physical distance to the fault.

The conditions in which the fault occurs may also affect the responses of the plurality of motors 304, 306, 308, and 310. For example, the voltage drop caused by the fault and the duration of the fault may influence which motors stall, if any, and which motors recover following the fault. The response may also be affected by the phase of the voltage at the time the fault occurs. As described above, the sinusoidal function of the supply voltage results in an alternating flux in the motor, and accordingly, may affect the motors' responses to the fault.

Figure 4:
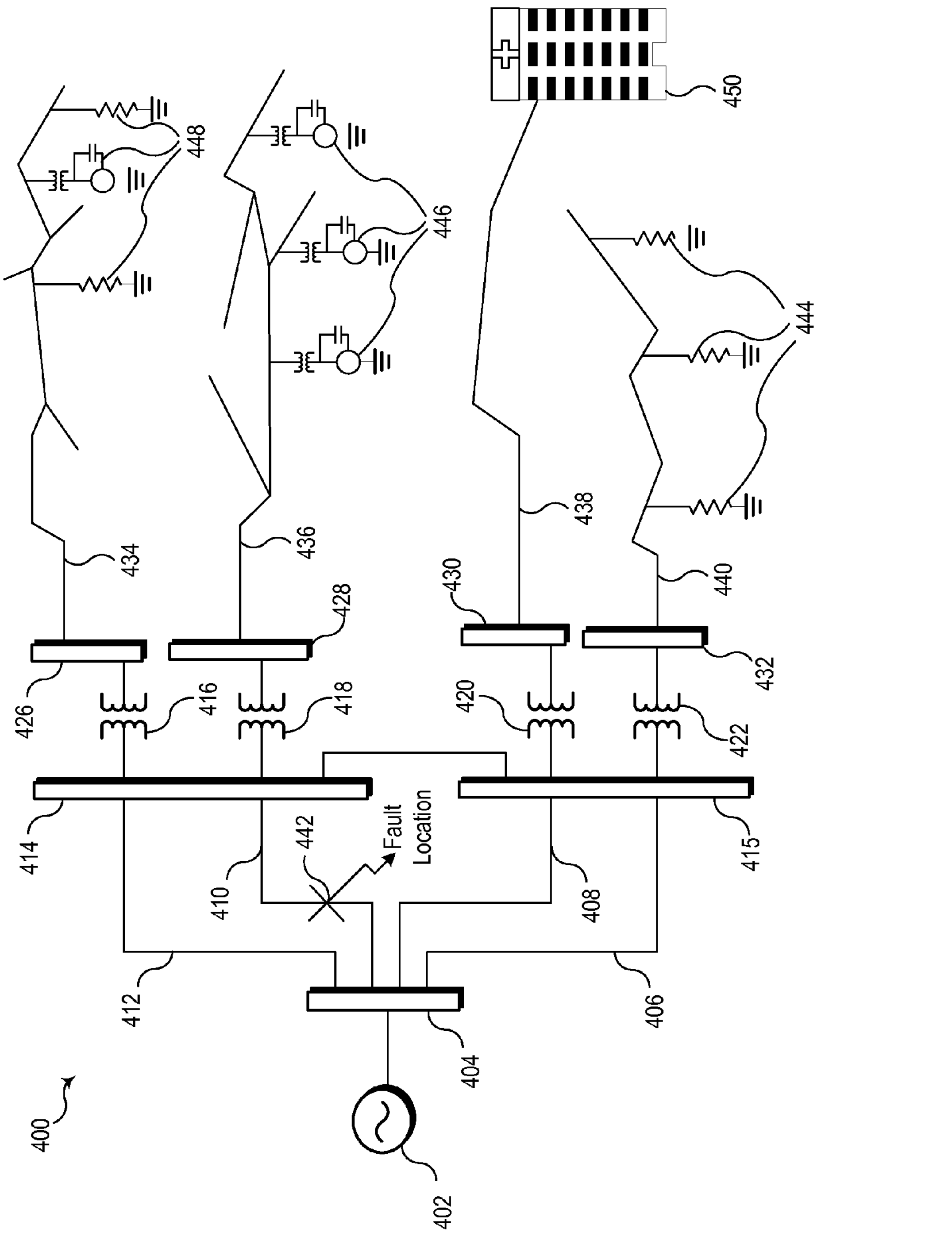
FIG. 4 illustrates a one line diagram of a system of an electric power transmission and distribution system in which a fault occurs on a transmission line consistent with embodiments of the present disclosure.

FIG. 4 illustrates a one line diagram of a system 400 of an electric transmission and distribution system in which a fault 442 occurs on a transmission line 410 consistent with embodiments of the present disclosure. In the illustrated system 400, a source 402 is in electrical communication with a transmission bus 404. Transmission bus 404 is in electrical communication with transmission busses 414 and 415 via transmission lines 406, 408, 410, and 412. A plurality of step down transformers 416, 418, 420, and 422 may be configured to step down a voltage to a level appropriate for distribution. A plurality of distribution busses 426, 428, 430, and 432 may supply a plurality of feeders 434, 436, 438, 440, respectively, which in turn supply a plurality of loads 444, 446, 448, and 450, respectively.

As a result of fault 442, system 400 may experience an FIDVR event under certain conditions. A control system (not shown) associated with system 400 may evaluate various criteria to assess the likelihood of the occurrence of an FIDVR event. In some embodiments, such criteria may include the duration of the fault, a voltage drop due to the fault, and when the fault occurs with respect to a phase of the supply voltage, an ambient temperature, power factors of the feeders, etc.

System 400 may be configured to implement a control strategy dependent upon the type of load connected to each feeder. In some embodiments, the type of load connected to a feeder may be inferred from a power factor. For example, the loads 446 on feeder 436 may include a large number of small single phase motors used in connection with air conditioning systems. When the ambient temperature is high the air conditioners may be operating frequently. The large number of motors may result in a large inductive load component and a power factor that is significantly below 1 (e.g., a power factor between 0.79 and 0.85). A decrease in voltage associated with an FIDVR event may result in an increased current draw. The increased current draw may exacerbate the voltage decrease during the FIDVR. Accordingly, if load shedding is part of a control strategy for avoiding or reducing the severity of the FIDVR event, shedding the feeder with the largest inductive load would result in the greatest benefit.

In contrast, feeder 440 may have a power factor near 1, and accordingly may include largely resistive loads 444. A decrease in voltage results in a decrease in current drawn by a feeder 440. Accordingly, in response to a likely FIDVR event, a control strategy employed to avoid or reduce the severity of the FIDVR event that selectively disconnects a feeder with a large inductive component would be more effective than a control strategy that selectively disconnects a feeder with a primarily resistive component.

Still further, certain feeders may have only a minor impact on the occurrence or severity of an FIDVR event. In the illustrated embodiment, loads 448 reflect a mixture of inductive and resistive loads. A decrease in voltage may cause the resistive components to draw less current, while the inductive component draws more current. Overall, the change in current flow through feeder 434 as a result of a change in voltage may be relatively small, and accordingly, may have only a small impact on the severity and/or duration of an FIDVR event.

A control system associated with system 400 may monitor a power factor associated with feeders 434, 436, 438, and 440 to identify feeders having a large inductive component, such as feeder 436. Based on a power factor and other criteria, a control system may assess whether disconnection of one or more feeders may avoid or reduce the severity of the FIDVR event caused by a fault 442. Moreover, the selective disconnection of certain feeders may be prioritized by the likely impact on avoiding or reducing the severity of the FIDVR event.

In addition to assessing a load profile, a control system consistent with the present disclosure may also assess a priority of the loads supplied by a particular feeder when developing a control strategy to avoid or reduce the severity of the FIDVR event. Certain loads may have a higher priority than other loads, and accordingly, may only be disconnected as a last resort. In the illustrated embodiment, a hospital 450 is connected to feeder 438. The hospital 450 may represent a high priority load that should not be selectively disconnected regardless of its load profile.

Figure 5:
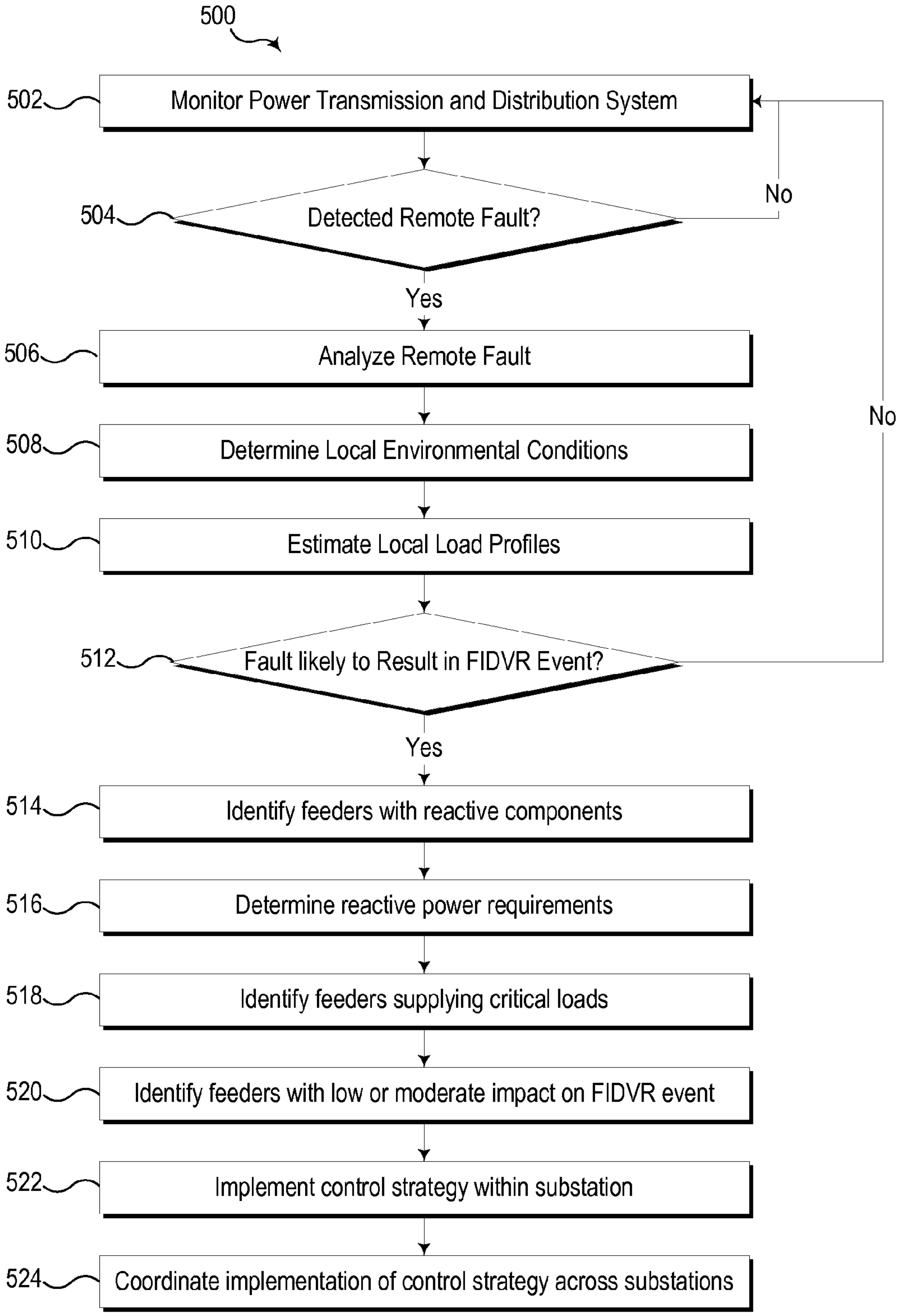
FIG. 5 illustrates a flow chart of a method for monitoring an electric power transmission and distribution system to identify the occurrence of a fault likely to cause an FIDVR event and implementing a control strategy to avoid or reduce the severity of the FIDVR event consistent with embodiments of the present disclosure.

FIG. 5 illustrates a flow chart of a method 500 for monitoring an electric power transmission and distribution system to identify the occurrence of a remote fault likely to cause an FIDVR event and implementing a control strategy to avoid or reduce the severity of the FIDVR event consistent with embodiments of the present disclosure. At 502, an electric power transmission and distribution system may be monitored. In various embodiments consistent with the present disclosure, a system implementing method 500 may include a plurality of IEDs configured to detect and communicate a wide variety of parameters. At 504, method 500 may determine whether a remote fault has been detected.

After a fault has been detected, at 506, the fault may be analyzed. A variety of parameters may be evaluated in various embodiments consistent with the present disclosure, such as a duration of the fault, the voltage dip due to the fault at the head of a feeder, and the phase of the voltage at which the fault occurs (e.g., 0 degrees, 40 degrees, 85 degrees, etc.).

At 508, local environmental conditions may be determined in the area serviced by the electric power transmission and distribution system. As described above, an FIDVR event may be more likely to occur when a large number of air conditioning systems are operating.

At 510, load profiles may be estimated. In some embodiments, a load estimate may be generated for each of a plurality of feeders. The load estimate may be based, at least in part, on a power factor associated with various loads.

Based on the analysis that occurs at 506, 508, and/or 510, method 500 may determine at 512 whether the fault is likely to result in an FIDVR event. If the fault is unlikely to result in an FIDVR event, the fault may be cleared and method 500 may return to monitoring the power transmission and distribution system at 502. If the fault is likely to result in an FIDVR event, method 500 may progress to 514.

At 514, feeders with reactive components may be identified. The identification of such feeders may be useful for identifying a control strategy for avoiding or ameliorating the effects of an FIDVR event. In some situations, feeders having large high reactive power requirements may be targeted by certain embodiments consistent with the present disclosure for load shedding to avoid or reduce the severity of the FIDVR event.

At 516, a system implementing method 500 may determine reactive power requirements. Such a determination may be based, in various embodiments, on the estimated load profiles and the identification of feeders with reactive components. In some circumstances the fault may increase the reactive power because single phase motors may stall as a result of the fault. Accordingly, supplying additional reactive power support may avoid or mitigate the severity of the FIDVR event. As described above, a decrease in supply voltage to a load with a large reactive power component may result in increased current draw. The increase in current may strain an electric power transmission and distribution system.

At 518, feeders supplying critical loads may be identified so that such loads are avoided in the event that load shedding is part of a control strategy. In some embodiments, critical loads may be avoided regardless of the overall load profile associated with the feeder supplying the critical load.

At 520, feeders with low or moderate impact on the FIDVR event may be identified. Such feeders may include a load profile that is likely to remain substantially unchanged as a result of the fault. Such feeders may include a load profile that includes a mix of resistive and inductive loads, such that a decrease in the supply voltage may not substantially alter the current drawn by the feeder. The identification of such feeders may be useful to avoid overshedding by avoiding feeders that are unlikely to significantly affect the occurrence or severity of an FIDVR event.

At 522 a control strategy within a substation may be implemented consistent with certain embodiments. For example, a substation controller may selectively connect one or more capacitor banks in response to a determination that reactive power support may avoid or reduce the severity of the FIDVR event. In another example, a substation controller may identify and selectively disconnect one or more feeders that are likely to increase the likelihood of the occurrence or severity of an FIDVR event.

At 524, a control strategy may be implemented across multiple substations consistent with certain embodiments. Coordination of the control strategy across multiple substations may provide a mechanism to avoid overshedding and to implement the most effective strategy for addressing the FIDVR event. In various embodiments, coordination of the control strategy may be accomplished using distributed control or using central control. In a distributed control scenario, a plurality of substation controllers may be enabled to make certain control decisions independently and to communicate with peer devices regarding other control decisions. In a central control strategy, a central controller may receive input from a plurality of devices, may analyze the input, and may direct the devices to take certain control actions.

Figure 6:
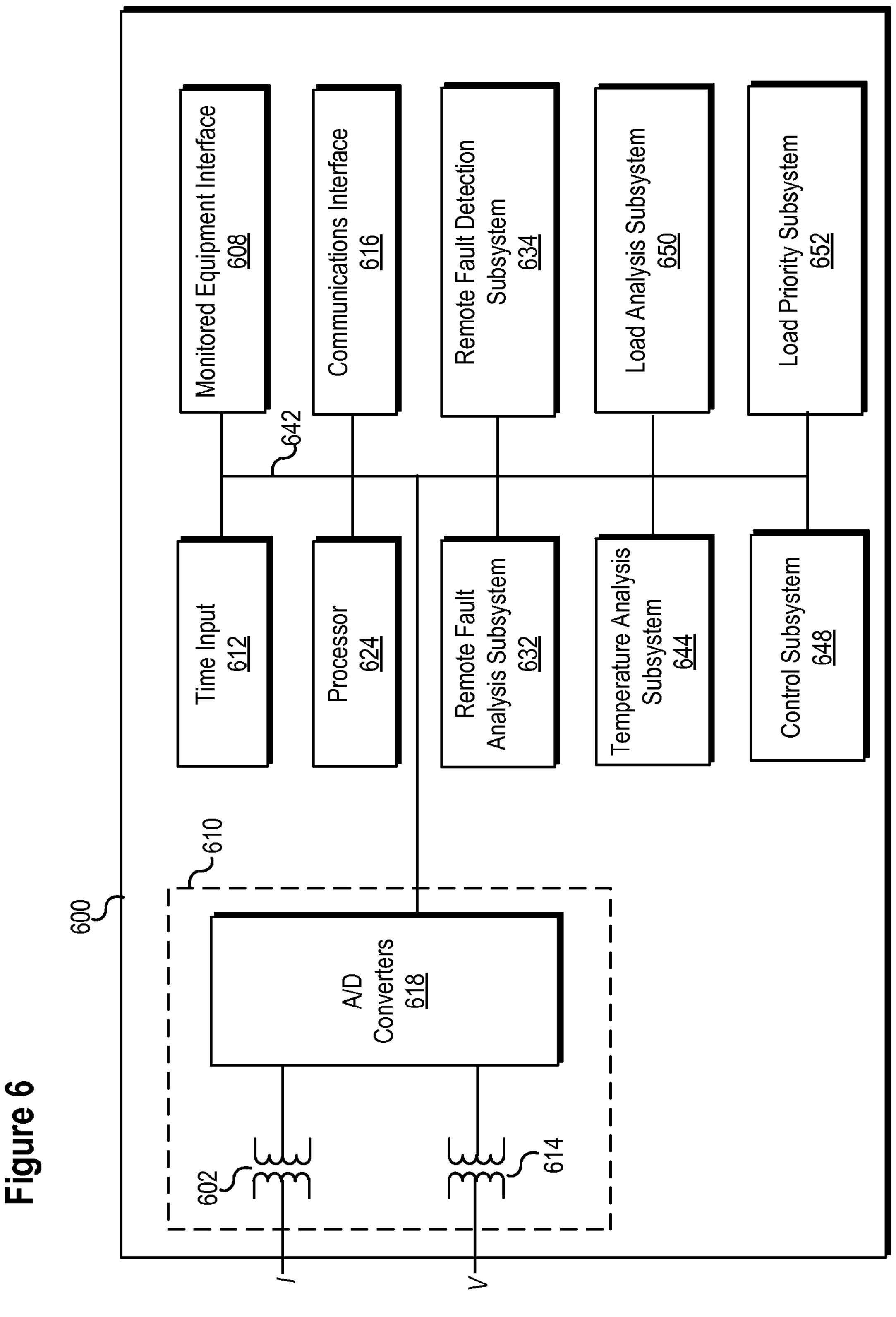
FIG. 6 illustrates a functional block diagram of a system configured to detect an FIDVR event and to implement a control strategy to avoid or reduce the severity of the FIDVR event consistent with embodiments of the present disclosure.

FIG. 6 illustrates a functional block diagram of a system 600 configured to detect an FIDVR event and to implement a control strategy to avoid or reduce the severity of the FIDVR event consistent with embodiments of the present disclosure. In certain embodiments, the system 600 may comprise an IED system configured, among other things, to detect faults, to estimate whether the fault is likely to generate an FIDVR event, and if so, to generate a control strategy to avoid or reduce the severity of the FIDVR event. System 600 may be implemented in an IED using hardware, software, firmware, and/or any combination thereof. Moreover, certain components or functions described herein may be associated with other devices or performed by other devices. The specifically illustrated configuration is merely representative of one embodiment consistent with the present disclosure.

System 600 includes a communications interface 616 configured to communicate with other IEDs, controllers, and/or devices associated with an electric power transmission and distribution system. In certain embodiments, the communications interface 616 may facilitate direct communication with another IED or communicate with another IED over a communications network. Communications interface 616 may facilitate communications with multiple devices. System 600 may further include a time input 612, which may be used to receive a time signal (e.g., a common time reference) allowing system 600 to apply a time-stamp to the acquired instructions or data points. In certain embodiments, a common time reference may be received via communications interface 616, and accordingly, a separate time input may not be required for time-stamping and/or synchronization operations. One such embodiment may employ the IEEE 1588 protocol. A monitored equipment interface 608 may be configured to receive status information from, and issue control instructions to, a piece of monitored equipment (such as a circuit breaker, conductor, transformer, or the like).

Processor 624 may be configured to process communications received via communications interface 616, time input 612, and/or monitored equipment interface 608 and to coordinate the operation of the other components of system 600. Processor 624 may operate using any number of processing rates and architectures. Processor 624 may be configured to perform any of the various algorithms and calculations described herein. Processor 624 may be embodied as a general purpose integrated circuit, an application specific integrated circuit, a field-programmable gate array, and/or any other suitable programmable logic device.

In certain embodiments, system 600 may include a sensor component 610. In the illustrated embodiment, sensor component 610 is configured to gather data directly from equipment such as a conductor (not shown) and may use, for example, transformers 602 and 614 and A/D converters 618 that may sample and/or digitize filtered waveforms to form corresponding digitized current and voltage signals provided to data bus 642. Current (I) and voltage (V) inputs may be secondary inputs from instrument transformers such as, CTs and VTs. A/D converters 618 may include a single A/D converter or separate A/D converters for each incoming signal. A current signal may include separate current signals from each phase of a three-phase electric power system. A/D converters 618 may be connected to processor 624 by way of data bus 642, through which digitized representations of current and voltage signals may be transmitted to processor 624. In various embodiments, the digitized current and voltage signals may be used to assess various electrical parameters relevant to the systems and methods disclosed herein. The data bus 642 may link monitored equipment interface 608, time input 612, communications interface 616, and a plurality of additional subsystems.

A remote fault detection subsystem 634 may be configured to detect a fault or to receive an indication of the occurrence of a fault. In some embodiments, fault detection subsystem 634 may be configured to operate in conjunction with the sensor component 610 to detect the occurrence of a fault by monitoring the electrical characteristics associated with the current and voltage inputs. In other embodiments, an indication of a fault may be communicated to system 600 through communications interface 616 and/or monitored equipment interface 608. Still further, certain embodiments may be configured to both monitor sensor component 610 and to receive an indication of a fault from either monitored equipment interface 608 or communications interface 616.

A fault analysis subsystem 632 may be configured to determine various parameters of a fault. In some embodiments, the fault analysis subsystem 632 may be configured to determine a duration of a fault, a voltage decrease caused by a fault, a point on a waveform at which the fault occurs (e.g., 0 degrees, 40 degrees, 85 degrees, etc.) and other parameters. In some embodiments, measurements used by the fault analysis subsystem 632 may be obtained using sensor component 610. In other embodiments, data regarding the fault may be received via monitored equipment interface 608 or communications interface 616.

A temperature analysis subsystem 644 may be configured to determine an ambient temperature in a particular geographic region in which system 600 is in operation. The ambient temperature may provide an indication of whether residential air conditioning units are likely to be operating, and if so, may also provide an indication of what proportion of a load the air conditioning units represent. As noted above, when the ambient temperature is high, air conditioning units may be operating frequently and in large numbers. The large number of motors may result in a large inductive load component that trigger or exacerbate an FIDVR event.

A load profile analysis subsystem 646 may be configured to determine a load profile based on a variety of factors. One factor that may be used to assess a load profile is the ambient temperature; however, other factors may also be assessed. Additional factors may include various electrical parameters associated with a particular load or feeder, such as a power factor or the amount of current drawn, etc. In some embodiments, a specific type of load profile may be specified by an operator of an electric power transmission and distribution system in which system 600 is operating. In some embodiments, load profile analysis subsystem 646 may be configured to assess the impact of a control action before the action is taken in order to assess the impact of the control action on an FIDVR event. For example, selectively disconnecting a feeder that provides electrical energy primarily to a resistive load would not assist avoiding or reducing the severity of an FIDVR event. Accordingly, load profile analysis subsystem 646 may be configured to avoid such an action. In another example, selectively disconnecting a feeder having a power factor of approximately 0.8 may help to avoid or reduce the severity of the FIDVR event. As such, load profile analysis subsystem may, in conjunction with other subsystems in system 600, be configured to selectively disconnect such a feeder as a last resort to avoid or reduce the severity of an FIDVR event.

A control subsystem 648 may be configured to implement control actions configured to avoid or mitigate the severity of an FIDVR event. Such actions may include, selectively providing reactive power support, controlling tap changes, identifying selected feeders for disconnection, and the like. In some embodiments, control subsystem 648 may be configured to implement a plurality of control actions within a substation. In other embodiments, control subsystem 648 may be configured to implement control actions that are coordinated across multiple substations. In some embodiments, communications regarding such control actions may be sent or received via communications interface 616.

A load priority subsystem 652 may be configured to assess the priority of load associated with various feeders. Load priority analysis subsystem 652 may be configured to avoid shedding high priority loads. In some embodiments, disconnecting high priority loads may be avoided regardless of the impact of such loads on an FIDVR event.

A load analysis subsystem 650 may be configured to determine the types of loads supplied by an electric transmission and distribution system. Load analysis subsystem 650 may determine the types of loads using a variety of techniques. In some embodiments, load analysis subsystem 650 may monitor a power factor. The power factor may provide an indication of the resistive and inductive components of the load. Further, in some embodiments, an operator of the electric power transmission and distribution system may specify the types of loads. Still further, in some embodiments, the responses of the loads to changes in electrical parameters may be used to develop a load model using the techniques disclosed in U.S. Pat. No. 8,706,309, which is assigned to the assignee of the present application.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may not include long-distance transmission of high-voltage power. Moreover, principles described herein may also be utilized for protecting an electric system from over-frequency conditions, wherein power generation would be shed rather than load to reduce effects on the system. Accordingly, many changes may be made to the details of the above-described embodiments without departing from the underlying principles of this disclosure. The scope of the present invention should, therefore, be determined only by the following claims.

What is claimed is:

1. A system configured to detect and correct a fault induced delayed voltage recovery event in an electric power transmission and distribution system, the system comprising:

a remote fault detection subsystem configured to receive an indication of a fault in the electric power transmission and distribution system;

a load analysis subsystem configured to analyze a plurality of loads supplied by the electric power transmission and distribution system to generate an estimated response of at least one load to a control action;

a remote fault analysis subsystem configured to analyze when the fault occurs with respect to a point on a voltage waveform of the faulted electrical phase at a time of the fault, a duration of the fault, and a drop in a voltage due to the fault and to determine a probability of the fault generating a fault induced delayed voltage recovery event based on the point on the voltage waveform of the faulted electrical phase at the time of the fault;

a temperature analysis subsystem configured to determine a temperature in the geographic area supplied by the electric power distribution and transmission system; and a control system configured to implement a control strategy within a control window following the fault, the control strategy comprising at least one control action to respond to the fault induced delayed voltage recovery event based on the probability of the fault generating a fault induced delayed voltage recovery event, the estimated response of the at least one load, and the temperature in the geographic area supplied by the electric power distribution and transmission system.

2. A system configured to detect and correct a fault induced delayed voltage recovery event in an electric power transmission and distribution system, the system comprising:

a fault detection subsystem configured to receive an indication of a fault in the electric power transmission and distribution system and when the fault occurs with respect to a point on a waveform at a time of the fault;

a load analysis subsystem configured to analyze a plurality of loads supplied by the electric power transmission and distribution system, to determine a load type, and to generate an estimated response of at least one load based on the determined load type;

a fault analysis subsystem configured to analyze a plurality of factors relating to the fault and to determine a probability of the fault generating a fault induced delayed voltage recovery event based on the point on the waveform at the time of the fault; and a control system configured to implement a control strategy within a control window following the fault, the control strategy comprising at least one control action to respond to the fault induced delayed voltage recovery event based on the probability of the fault generating a fault induced delayed voltage recovery event and the estimated response of the at least one load.

3. The system of claim 2, wherein the at least one control action comprises selectively connecting a capacitor bank to provide reactive power support.

4. The system of claim 2, further comprising a load priority subsystem configured to identify at least one high-priority load and to prevent shedding of the at least one high-priority load in the implementation of the control strategy.

5. The system of claim 2, wherein the load analysis subsystem is further configured to identify a feeder with low impact on the fault induced delayed voltage recovery event and to prevent disconnection of the identified feeder in the implementation of the control strategy.

6. The system of claim 2, further comprising identifying at least one feeder with a reactive component and wherein the at least one control action comprises selectively disconnecting the identified feeder.

7. The system of claim 2, wherein the control window comprises a time of 50 milliseconds to 100 milliseconds after the fault and excluding breaker operation time.

8. The system of claim 2, wherein implementing the control strategy to respond to the fault induced delayed voltage recovery event comprises communicating the control strategy to a plurality of intelligent electronic devices in a plurality of substations and coordinating a plurality of control actions at the plurality of substations.

9. The system of claim 2, wherein the plurality of factors relating to the fault comprises at least one of a duration of the fault, and a drop in a voltage due to the fault.

10. The system of claim 2, further comprising a temperature analysis subsystem configured to determine a temperature in the geographic area supplied by the electric power distribution and transmission system.

11. The system of claim 2, wherein analyzing the plurality of factors relating to the fault comprises estimating a power factor of a feeder.

12. The system of claim 11, wherein estimating the power factor further comprises estimating an inductive power ratio to a resistive power ratio.

13. A method for detecting and correcting a fault induced delayed voltage recovery event in an electric power transmission and distribution system comprising:

monitoring an electric power transmission and distribution system; detecting a fault;

analyzing when the fault occurs with respect to a point on a waveform at a time of the fault;

analyzing a first load supplied by the electric power transmission and distribution system;

determining a probability of the fault generating a fault induced delayed voltage recovery event based on the point on the waveform; and implementing a control strategy within a control window following the fault, the control strategy comprising at least one control action to respond to the fault induced delayed voltage recovery event based on the probability of the fault generating a fault induced delayed voltage recovery event and the estimated response of the at least one load.

14. The method of claim 13, wherein the at least one control action comprises selectively connecting a capacitor bank to provide reactive power support.

15. The method of claim 13, further comprising identifying at least one feeder supplying a critical load and wherein the control strategy avoids disconnection of the identified feeder.

16. The method of claim 13, further comprising identifying a feeder with low impact on the FIDVR event and wherein the control strategy avoids disconnection of the identified feeder.

17. The method of claim 13, further comprising identifying at least one feeder with a reactive component and wherein the at least one control action comprises selectively disconnecting the identified feeder.

18. The method of claim 13, wherein the control window comprises a time of 50 milliseconds to 100 milliseconds after the fault and excluding breaker operation time.

19. The method of claim 13, wherein implementing the control strategy to respond to the fault induced delayed voltage recovery event comprises communicating the control strategy to a plurality of intelligent electronic devices in a plurality of substations and coordinating a plurality of control actions at the plurality of substations.

20. The method of claim 13, further comprising determining when the fault occurs with respect to the phase of the waveform, determining a duration of the fault, and determining a drop in a voltage due to the fault.

21. The method of claim 13, further comprising assessing an ambient temperature in the geographic area supplied by the electric power distribution and transmission system.

22. The method of claim 13, further comprising estimating a power factor of a feeder.

23. The method of claim 22, wherein estimating the power factor further comprises estimating an inductive power ratio to a resistive power ratio.

* * * * *